(12) United States Patent
Schmitz

(10) Patent No.: US 12,434,335 B2
(45) Date of Patent: Oct. 7, 2025

(54) METHOD FOR PRODUCING OR RELEASING A PRESS-FIT CONNECTION AND TOOL

(71) Applicant: ZF Friedrichshafen AG, Friedrichshafen (DE)

(72) Inventor: Ewald Schmitz, Daisendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/021,988

(22) Filed: Jan. 15, 2025

(65) Prior Publication Data
US 2025/0229371 A1 Jul. 17, 2025

(30) Foreign Application Priority Data
Jan. 16, 2024 (DE) .................... 10 2024 200 361.1

(51) Int. Cl.
*B23P 19/027* (2006.01)
*B23P 19/02* (2006.01)
B23P 19/033 (2006.01)
B23P 19/04 (2006.01)
B25B 27/02 (2006.01)

(52) U.S. Cl.
CPC ............. *B23P 19/02* (2013.01); *B23P 19/027* (2013.01); *B23P 19/025* (2013.01); *B23P 19/033* (2013.01); *B23P 19/047* (2013.01); *B25B 27/026* (2013.01); *Y10T 29/4987* (2015.01); *Y10T 29/49872* (2015.01)

(58) Field of Classification Search
CPC .... B25B 27/026; B23P 19/025; B23P 19/026; B23P 19/027; B23P 19/033; B23P 19/047; Y10T 29/49872; Y10T 29/4987
See application file for complete search history.

(56) References Cited

FOREIGN PATENT DOCUMENTS

| EP | 0749801 A1 * | 12/1996 | ............. B25B 27/28 |
| JP | H06210526 A * | 8/1994 | |
| WO | WO2010020230 A1 | 2/2010 | |
| WO | WO2024159262 A1 | 8/2024 | |

OTHER PUBLICATIONS

German Patent Office, Office Action cited in German Patent Application No. 10 2024 200 361.1 (Sep. 20, 2024).

* cited by examiner

*Primary Examiner* — Jermie E Cozart
(74) *Attorney, Agent, or Firm* — Finch & Maloney PLLC

(57) ABSTRACT

Making or undoing an oil press fit between a first and second components at respective fitting surfaces includes pressurizing a channel in the second component to produce or release the oil press fit. Oil is applied by the channel during pressurization from a connection between a first fitting surface on the first component and a second fitting surface on the second component. The channel is defined, at least in sections, by two holes intersecting at a point of intersection, one of which is subdivided by the point of intersection into a first part leading to the second fitting surface and a second part opening to an outer side of the second component. Prior to pressurization, an elastically deformable sealing element is placed at the point of intersection, and it is then pressed into the second part of the hole at the point of intersection in a sealing manner.

10 Claims, 4 Drawing Sheets

METHOD FOR PRODUCING OR RELEASING A PRESS-FIT CONNECTION AND TOOL

RELATED APPLICATIONS

This application claims the benefit of and right of priority under 35 U.S.C. § 119 to German Patent Application no. 10 2024 200 361.1, filed on 16 Jan. 2024, the contents of which are incorporated herein by reference in its entirety.

FIELD OF THE DISCLOSURE

The invention relates to a method for making or undoing a press fit between a first component and a second component at fitting surfaces of the components. Furthermore, the invention relates to a tool for performing variants of a method for making or releasing a press fit.

BACKGROUND

Among other things, press fits are used to connect components, in which the fitting surfaces of the components to be connected are designed with oversize fits so that a press fit is created between the components to be connected after joining. This connection technology is often used to form a connection between a shaft and a hub. One variant of a press fit is the formation of a so-called oil press fit, in which the components to be connected are first elastically deformed at their fitting surfaces under oil pressure and can thus be positioned in relation to each other in the end position. After the components have been positioned in the end position, the application of oil pressure to the fitting surfaces is then terminated and the components return to their original dimensions. This then displaces the oil between the fitting surfaces, whereupon the press fit between the components is established. To loosen a press fit, the fitting surfaces of the connected components must be moved apart, which sometimes requires the use of special devices. In the case of an oil press fit, loosening can be made easier by reapplying oil pressure, which causes the components to be elastically deformed again, thus simplifying the separation of the components.

WO 2010/020230 A1 describes a device for releasing press fits, whereby the device is specifically designed as a dismantling press that is used to dismantle the wheel sets of rail vehicles by pressing wheel disks, brake disks or gear wheels off of an axle shaft of a wheel set. The respective pressing is carried out by a press piston of the disassembly press.

SUMMARY

On the basis of the prior art described above, the object of the present invention is to realize a method for producing or releasing a press fit of components present as an oil press fit, wherein sufficient pressurization of fitting surfaces of the components with pressure oil can be realized even if a section of a channel for supplying the pressure oil to the fitting surfaces is not or only incompletely sealed in one area.

This object is achieved on the basis of the preamble of the independent claim in conjunction with the characterizing features of said claim. The dependent claims which follow each represent advantageous further developments of the invention. A tool that is used to carry out at least one variant of the method according to the invention is also the subject of the claims.

According to the invention, a method is carried out to establish or to release a press fit between a first component and a second component at fitting surfaces of the components. Preferably, one component is a shaft and the other component is a hub-shaped component, in particular a hollow shaft, wherein the first component preferably is the shaft and the second component being the hub-shaped component. The first component is particularly preferred as an output shaft and the second component as a hollow shaft of a rail vehicle transmission. According to the invention, the method can be used to make the press fit, but it is preferably used only to release a press fit between the components.

The press fit is produced or to be produced on fitting surfaces of the two components, with one fitting surface preferably being designed on the outer circumference of one component and the other fitting surface on the inner circumference of the other component. In particular, the components in the area of the fitting surfaces are each slightly conical in shape, so that the respective fitting surface is therefore present as the lateral surface of a respective conical section of the respective component.

The invention encompasses the technical teaching that the press fit is an oil press fit and that, to create or release this oil press fit, pressure is applied to a channel configured in the second component, via which oil is conducted under pressure between a first fitting surface formed on the first component and a second fitting surface formed on the second component, starting from a pressure oil connection during pressurization. In this case, the channel is defined, at least in sections, by two drill holes that intersect at a single point, one of which is subdivided by the point of intersection into a first part leading to the second fitting surface and a second part opening out on an outer side of the second component. In the run-up to pressurization, an elastically deformable sealing element is placed at the point of intersection and then, before pressurization, it is pressed into the second part of the drill hole at the intersection, creating a seal.

In other words, the press fit to be created or released is designed as an oil press fit. To create or release the oil press fit, oil under pressure is fed between the fitting surfaces of the components, for which purpose the oil is supplied to a pressure oil connection with which a channel running in the second component is provided. At least one section of this channel is formed by two drill holes that intersect inside the second component. One of the drill holes passes between the second fitting surface of the second component and an outer side of the second component, this drill hole being divided by the point of intersection with the other drill hole into a first part and a second part, via the first part of which a connection is made from the point of intersection to the second fitting surface and via the second part of which a connection is made from the point of intersection to the outer side of the second component. Before pressurization is carried out at the pressure medium connection with the pressurized oil, a sealing element that can be elastically deformed is positioned at the point of intersection. After the positioning has been completed, the sealing element is then also pressed into the second part of the drill hole before pressure is applied, thereby sealing the second part of the drill hole at the point of intersection.

The advantage of the method according to the invention for producing or releasing the press fit present as an oil press fit is that by sealingly closing the second part of the drill hole, it can be reliably ensured that the pressurized oil is directed exclusively in the direction of the second fitting surface and thus between the fitting surfaces of the components, whereby sufficient pressure can be generated here to produce or release the oil press fit. This is because pressing the sealing element into the second part of the drill hole at the point of intersection prevents oil from reaching the outside of the second component. This can prevent oil from escaping from the outside of the second component if the seal of this drill hole is otherwise missing or insufficient, which would otherwise at least impede the pressure build-up for making or breaking the oil press fit. The sealing element can be placed and pressed in with little assembly work, which ultimately also makes it easy to create or release the oil press fit.

The channel in the second component is preferably formed only by the two drill holes, wherein in particular one drill hole extends at least predominantly axially in the second component and is thus present as a longitudinal drill hole, while the other bore is preferably formed so that it extends at least predominantly radially in the second component and is thus designed as a transverse drill hole. In this case, the cross-hole is the drill hole connecting the second fitting surface and the outside of the second component. In the preferred design of the second component as a hub-shaped component, in particular as a hollow shaft, this drill hole then extends between the second fitting surface on an inner circumference of the second component and an opening on the outside in the form of an outer circumference of the second component. A contact surface for a further component, in particular a spur gear, is particularly preferred at the mouth on the outer circumference, but the placement of this further component at the mouth only achieves an inadequate seal of the second part of the drill hole on the outside of the second component. The pressure medium connection is preferably designed at the mouth of the longitudinal drill hole on one end face of the second component.

The essential feature of the invention is that the elastically deformable sealing element is transferred to the point of intersection before the application of pressure and then, also before the application of pressure, is pressed into the second part of the drill hole in such a way that the second part of the drill hole is sealed at the point of intersection. This is because it can be used to achieve a sufficient pressure build-up in the channel if the second part of the drill hole on the outside of the second component is missing or insufficiently sealed.

Preferably, the second part of the drill hole leads from the point of intersection to an annular channel which is formed on the second fitting surface of the second component and from which the oil guided here is directed in a circulating manner between the second fitting surface and the first fitting surface.

According to one embodiment of the invention, an elastomer element is used as the sealing element, which is particularly present as a rubber element or as a plastic element. An elastomer element has a high elastic deformability, so that the sealing element can then reliably seal the second part when pressed into the second part of the drill hole. Alternatively or in addition, a spherically shaped element is used as a sealing element, whereby a suitable geometry for a reliable, circumferential sealing of the second part of the drill hole is realized at the sealing element.

According to one embodiment of the invention, the sealing element is placed at the point of intersection using an elongated tool, for which purpose the sealing element is held at one end of the tool in a receiver, and after the sealing element has been placed at the receiver, the tool is inserted from the pressure oil connection into the channel and is positioned at the point of intersection with the end. This has the advantage that the tool can be used to precisely place the sealing element at the point of intersection, without the sealing element being damaged before it is pressed in, which could otherwise affect the sealing of the second part of the drill hole. This is because the tool can be used to easily insert the sealing element attached to the receiver into the channel from the side of the pressure oil connection and place it at the point of intersection. In particular, the sealing element is also lightly pressed into the tool receiver. The elongated tool is preferably designed in the shape of a rod or lance.

In a further development of the above design, after the end of the tool has been positioned at the point of intersection, the sealing element is also pressed into the second part via the receiver aligned transversely on the tool for this purpose. In this case, the pressing-in is preferably carried out by means of a pressurized fluid, which for this purpose is supplied via the tool after the end of the tool has been positioned at the point of intersection, the supply of the fluid pressurizing the receiver of the tool at the sealing element and the sealing element thereby being transferred out of the receiver into the second part and pressed in there. This means that the sealing element can also be pressed into the second part of the drill hole with little effort by applying pressure to the seat of the sealing element on the tool at the point of intersection after the sealing element has been placed, thereby pressing the sealing element into the second part. In particular, a volume flow of the fluid supplied for the pressing-in process is metered via a valve of the tool, so that an operator of the tool can control the pressing-in of the sealing element.

It is a further embodiment of the invention that the sealing element is removed from the second part after the oil press fit has been released. If the sealing element is designed as an elastomer element, this removal can be carried out in particular using a pointed tool, such as a needle, or, if necessary, using the tool described above.

The invention also relates to a tool that is used in at least one of the variants of the method according to the invention described above to create or release the oil press fit. This tool comprises a first end at which a receiver for placing the sealing element is formed, the first end being connected via an elongated connecting section to a second end at which a handle for operating the tool is formed. Overall, the tool is therefore elongated, with the handle at the first end connected to the receiver at the second end by the elongated connecting section. The receiver and the connecting section are to be designed sufficiently narrow so that, in the course of carrying out the method according to the invention, it is possible to insert the receiver together with the sealing element arranged on it and, subsequently, the connecting section into the channel.

The tool receiver is preferably designed with a recess into which the sealing element can be inserted, preferably pressed, in order to hold the sealing element in the tool.

In particular, the receiver is designed to lie transversely at the first end, so that the sealing element can also be placed not on the front side of the tool, but laterally on it, lying on the receiver.

The tool is advantageously designed in that a pressure connection for the fluid is provided at the second end, wherein a line is configured in the handle, which serves to connect to the pressure connection, and which is connected to an outlet line via the tubular connecting section, wherein the outlet line opens at the receiver. This allows the tool to direct pressurized fluid from the handle to the receiver, where it is used to press the sealing element placed on the receiver into the second part of the drill hole. The preferred fluid for this is compressed air, although oil could also be used.

In the further training of the aforementioned variant, the valve metering the volume flow of the supplied fluid is arranged in the handle between the pressure connection and the line in the tool that is conditioned for carrying out the process according to the invention by metering a volume flow of the fluid supplied for the injection. This allows the valve to be operated by an operator in a simple manner. The valve is preferably designed as a metering gun on the handle, which makes operating the valve much easier for an operator.

In the context of the invention, the tool can also be designed in such a way that the pressure connection for supplying the fluid is permanently connected to the tubular connecting section in the handle, so that when pressure is applied to the pressure connection, fluid is also permanently supplied to the receiver.

The receiver is preferably formed on a cylindrical individual part that is attached to an individual part forming the connecting section, wherein, in addition, the individual part forming the connecting section and an individual part of the handle are attached to one another. This means that the tool is made up of several individual parts, of which one individual part forms the receiver and one individual part forms the connecting section, and one individual part is assigned to the handle. Most preferably, each of said individual parts is made of metal and attached to the others by brazing. However, a one-piece design of the tool could also be used.

BRIEF DESCRIPTION OF THE DRAWINGS

Advantageous embodiments of the invention, which are explained below, are shown in the drawings. The figures show.

DETAILED DESCRIPTION

Figure 1:
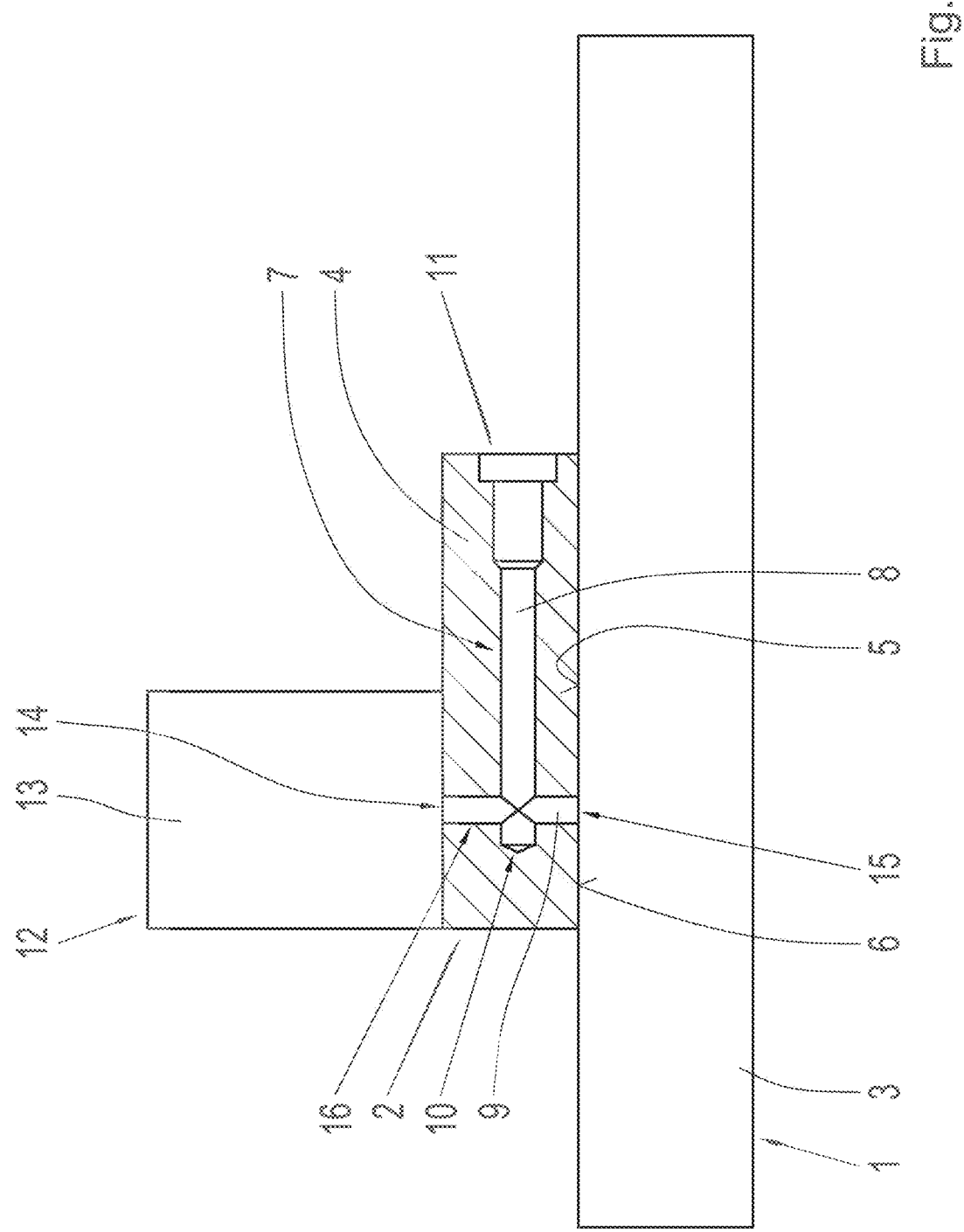
FIG. 1: a sectional view of an area of a press fit connection made between two components.

FIG. 1 shows a cross-section of the area of a press fit between two components 1 and 2, which is specifically realized as an oil press fit. While component 1 is an output shaft 3 of a rail vehicle, component 2 is a hollow shaft 4 of a rail vehicle transmission of the rail vehicle. The oil press fit is formed between the fitting surfaces 5 and 6 of the two components 1 and 2, with the fitting surface 5 being formed on an outer circumference of the component 1 and the fitting surface 6 being formed on an inner circumference of the hub-like component 2. In a manner known to those skilled in the art, the oil press fit was produced by passing oil at high pressure between the fitting surfaces 5 and 6, thereby causing an elastic expansion of component 2 and an elastic compression of component 1, wherein the two components 1 and 2 then, after being placed in the desired position and after the oil supply has been terminated, resumed their original dimensions and were thereby pressed together.

For the supply of the oil between the fitting surfaces 5 and 6, a channel 7 is configured in the component 2, which is defined by two drill holes 8 and 9 that intersect within the component 2 at a point of intersection 10. Drill hole 8 runs axially as a longitudinal drill hole in component 2 and opens out at one end face of component 2 in a pressure oil connection 11, while drill hole 9 is designed as a transverse drill hole running predominantly radially in component 2. The drill hole 9 leads on the one hand to the fitting surface 6 of the component 2 and on the other hand to an outer circumference, on which a further component 12 in the form of a spur gear 13 is placed on the component 2. An opening 14 of the drill hole 9 on the outer circumference of the component 2 is covered by the component 12.

Drill hole 9 is subdivided into a first part 15 and a second part 16 by the point of intersection 10 with drill hole 8, the first part 15 running from the point of intersection 10 to the fitting surface 6 of the component 2, while the second part 16 runs from the point of intersection 10 to the opening 14.

To loosen the oil press fit between the two components 1 and 2, oil must be fed again between the fitting surfaces 5 and 6 of the components 1 and 2, in order to remove the press fit between the two components 1 and 2 by renewed elastic deformation of the two components 1 and 2. The problem with this, however, is that the inadequate covering of the opening 14 by component 12 makes it difficult or impossible to build up the necessary pressure between the fitting surfaces 5 and 6. For this reason, in a process according to the invention, the second part 16 of the drill hole 9 is sealed at the point of intersection 10 before pressurizing the channel 7 with pressurized oil, thus preventing oil from escaping through the opening 14.

Figure 2:
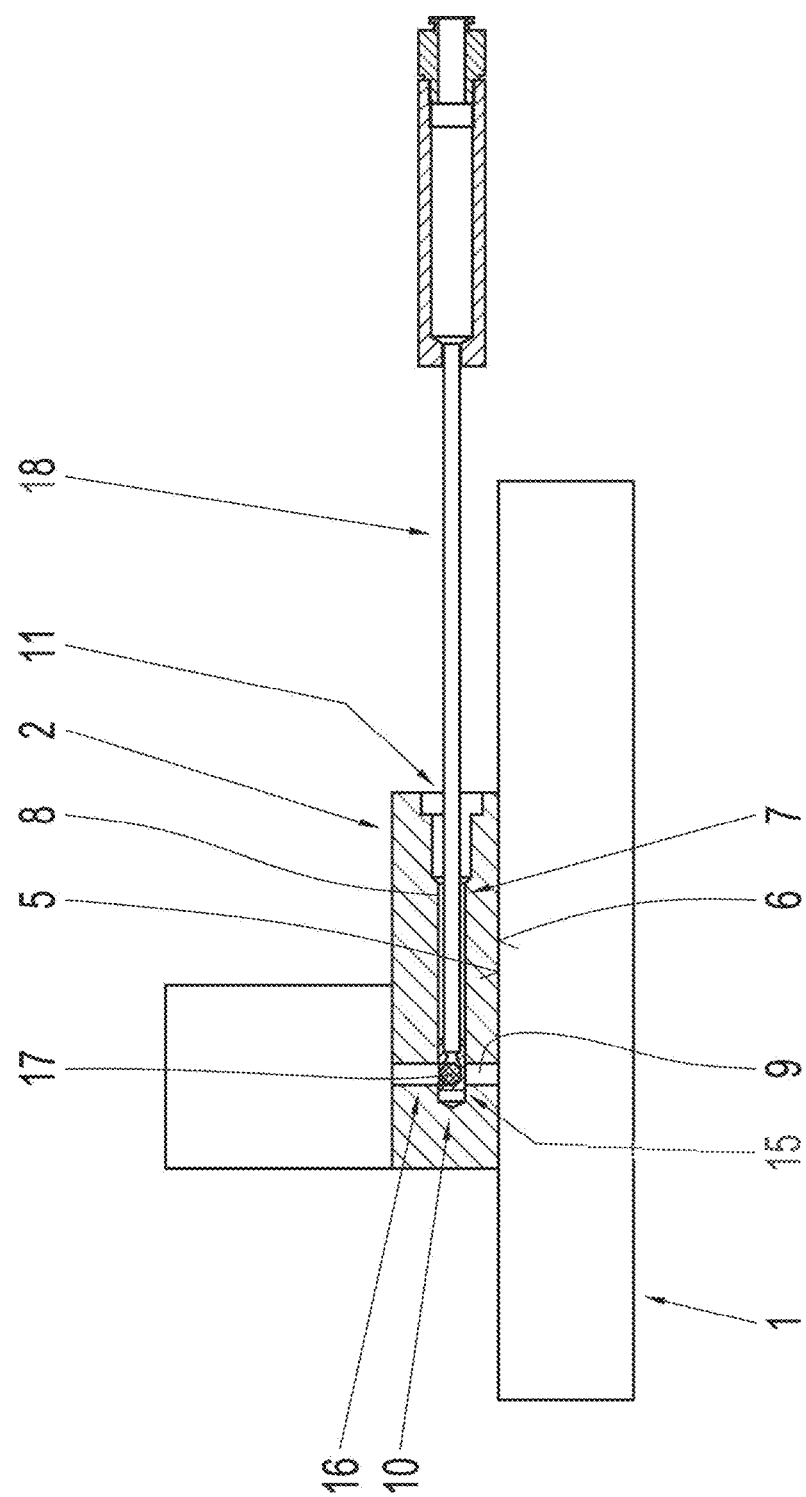
FIG. 2: the area of the press fit in the course of carrying out a method according to the invention for releasing the press fit.

To do this, an elastically deformable sealing element 17 is placed at the point of intersection 10 of the drill holes 8 and 9, as indicated in FIG. 2, and pressed into the second part 16 of the drill hole 9 to form a seal. As a result, oil from drill hole 8 that is routed through channel 7 can only flow into the first part 15 of drill hole 9. The sealing element 17 is designed as an elastomer element and is spherical in shape.

Figure 3:
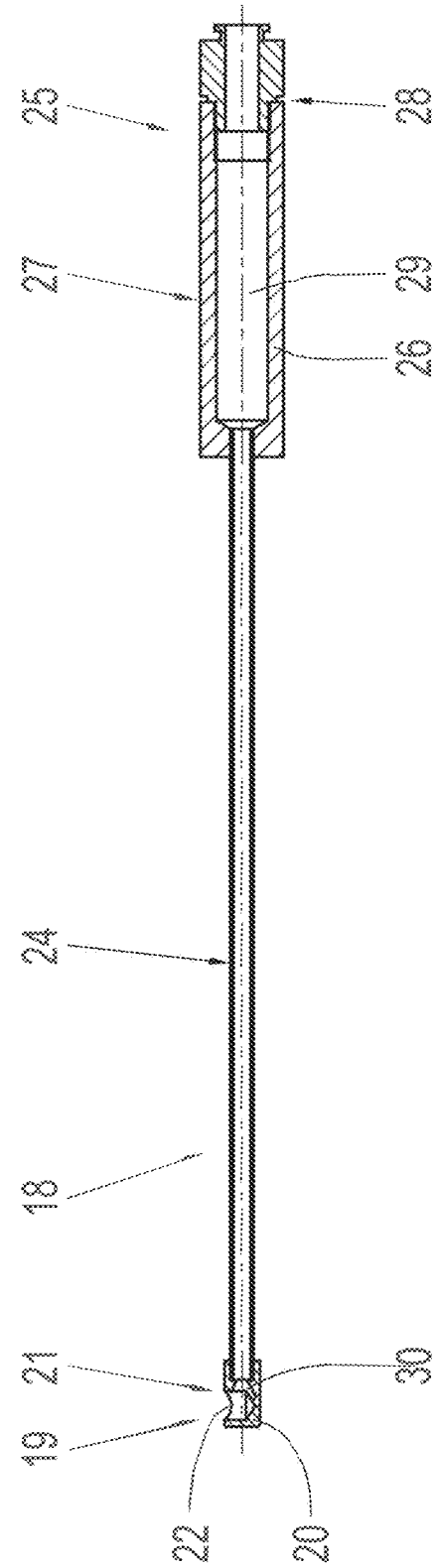
FIG. 3: sectional view of a tool used in the method according to a first embodiment of the invention.

For the placement and pressing in of the sealing element 17, a tool 18 is used in the process according to the invention, which is shown in FIG. 2 at the point of intersection 10 during the placement of the sealing element 17 and is shown individually in section in FIG. 3. As can be seen in particular in FIG. 3, the tool 18 has an individual part 20 at a first end 19, which laterally forms a receiver 21 for the sealing element 17. The receiver 21 is defined as a recess 22 designed in the individual part 20. The individual part 20 is attached to a further tubular shaped individual part 23, which is also elongated and forms a connecting section 24 of the tool 18. A connection to a second end 25 of the tool 18 is established via the connecting section 24, with a further individual part 26 being provided at this end 25, which is attached to the individual part 23 and forms a handle 27 of the tool 18.

The tool 18 has an overall rod- or lance-like shape, with the individual parts 20 and 23 being dimensioned such that it is possible to insert the tool 18 into the drill hole 8, as shown in FIG. 2. To position the sealing element 17 at the point of intersection 10, the sealing element 17 is placed in the receiver 21 before insertion into the drill hole 8 of the channel 7, and is preferably lightly pressed into the recess 22. The sealing element 17 is then positioned at the intersection point 10 by means of the tool 18, for which the tool 18 is inserted with the end 19 from the pressure oil connection 11 into the drill hole 8.

The pressing of the sealing element 17 into the second part 16 of the drill hole 9 is carried out after the placement of the sealing element 17 at the intersection point 10 by means of a fluid, which is in particular compressed air. For this purpose, the fluid is directed via the tool 18 from the end 25 to the receiver 21, causing the sealing element 17 received therein to be moved out of the receiver 21 and then pressed into the second part 16. As can be seen in FIG. 3, a pressure connection 28 is configured at the end 25 for the supply of the fluid, at which a line 29 configured in the handle 27 opens. The latter is then connected via the tubular connecting section 24 to an outlet line 30, which opens into the receiver 21. Thus, the fluid introduced at pressure connection 28 is conducted within the tool 18 to the receiver 21, where it ensures that the sealing element 17 is pressed into the second part 16 of the drill hole 9.

After the sealing element 17 has been pressed into the second part 16, the tool 18 is then moved out of the drill hole 8 and the channel 7 is then pressurized via the pressure oil connection 11, whereby the elastic expansion of the components 1 and 2 is achieved by pressurization between the fitting surfaces 5 and 6, thus enabling the oil press fit to be released. Once it has been released, the sealing element 17 can then be removed from the second part 16 of the drill hole 9.

In addition to releasing the oil press fit, the method can also be used within the scope of the invention to create an oil press fit between the components 1 and 2 if insufficient pressure build-up is also possible here due to the inadequate covering of the opening 14 over the component 12. In this case, the sealing element 17 is placed in front of the tool 18 at the point of intersection 10 and pressed into the second part 16 in the same way before the pressure oil connection 11 is pressurized to create the oil press fit. After the oil press fit has been made, the sealing element 17 can then be removed again.

Figure 4:
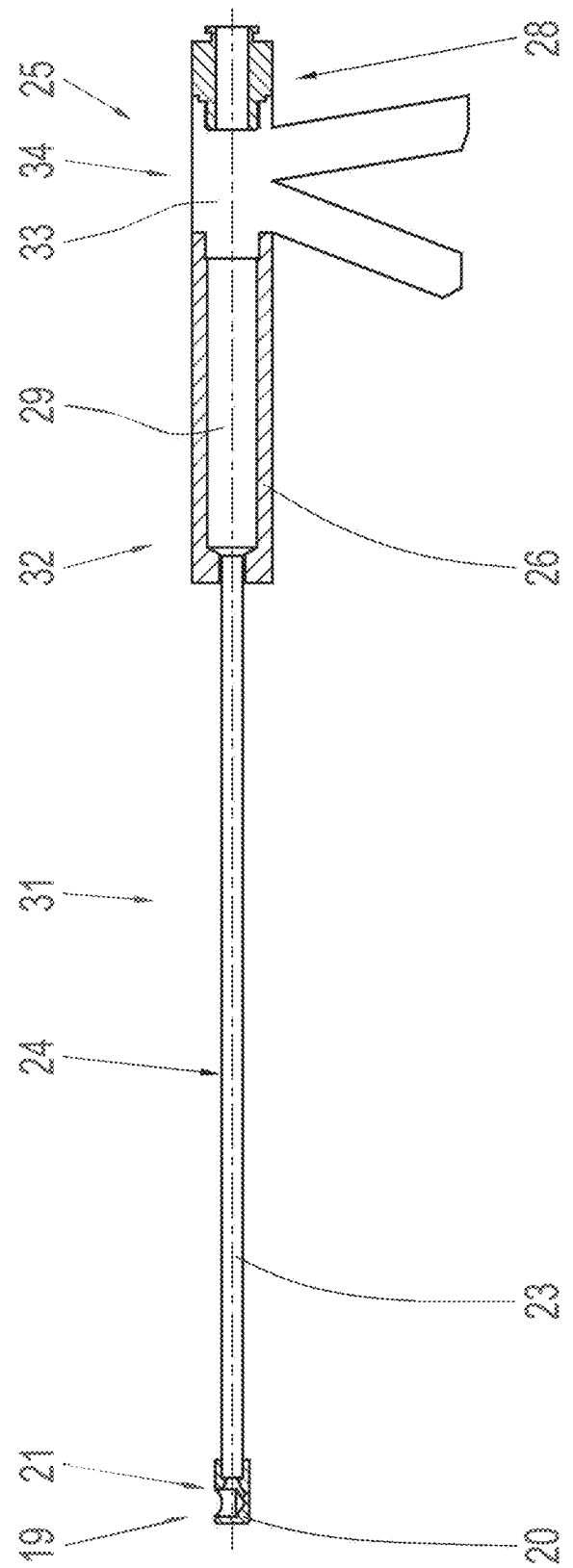
FIG. 4: a sectional view of an alternative design of a tool according to the invention.

Finally, FIG. 4 shows an alternative design of tool 31, which can be used as an alternative to tool 18 to carry out the process. The tool 31 corresponds as closely as possible to the tool 18 from FIG. 3, with the difference that a handle 32 provided at the end 25 has, in addition to the individual part 26, a metering gun 33, via which a valve 34 of the tool 31 is formed. In this case, this valve 34 is arranged between the line 29 of the individual part 26 and the pressure connection 28 and enables an operator of the tool 31 to meter a volume flow of the fluid guided to the receiver 21. Otherwise, tool 31 corresponds to tool 18 in FIG. 3, so please refer to the description provided there.

The process according to the invention can be used to reliably loosen or create an oil press fit.

REFERENCE NUMBERS

1 Component
2 Component
3 Output shaft
4 Hollow shaft
5 Fitting surface
6 Fitting surface
7 Channel
8 Drill hole
9 Drill hole
10 Point of intersection
11 Pressure oil connection
12 Component
13 Spur gear
14 Opening
15 Part
16 Part
17 Sealing element
18 Tool
19 End
20 Individual part
21 Receiver
22 Recess
23 Individual part
24 Connecting section
25 End
26 Individual part
27 Handle
28 Pressure connection
29 Line
30 Outlet line
31 Tool
32 Handle
33 Metering gun
34 Valve

The invention claimed is:

1. A method for producing or releasing an oil press fit between a first component and a second component at fitting surfaces of the first and the second components, the method comprising:
   providing a first component having a first fitting surface;
   providing a second component defining a channel and having a second fitting surface, wherein the channel is defined, at least in part, by two holes that intersect at a point of intersection, one of the two holes being subdivided by the point of intersection into a first part leading to the second fitting surface and a second part opening to an outer side of the second component;
   placing an elastically deformable sealing element at the point of intersection;
   pressing the elastically deformable sealing element into the second part of the one of the two holes at the point of intersection in a sealing manner; and
   pressurizing the channel in the second component, via which oil is directed under pressure starting from a pressure oil connection between the first fitting surface and the second fitting surface.

2. The method according to claim 1, wherein the sealing element is made of an elastomeric material.

3. The method of claim 2, wherein the elastomeric material is a rubber.

4. The method of claim 2, wherein the elastomeric material is a plastic.

5. The method according to claim 1, wherein the sealing element has a spherical shape.

6. The method according to claim 1, wherein placing the sealing element at the point of intersection is performed by use of an elongated tool and placing the sealing element includes:
   holding the sealing element by a receiver at a first end of the elongated tool;
   introducing the first end of the elongated tool into the channel; and
   positioning the first end of the elongated tool at the point of intersection.

7. The method according to claim 6, comprising, after positioning the first end of the tool at the point of intersection:

pressing the sealing element, using the tool, into the second part via the receiver aligned transversely on the elongated tool.

8. The method according to claim 7, wherein pressing the sealing element is performed by use of a pressurized fluid that is supplied via the elongated tool after the first end of the elongated tool has been positioned at the point of intersection, and wherein the admission of the pressurized fluid pressurizes the receiver of the sealing element on the elongated tool, and the sealing element is thereby transferred out of the receiver into the second part and is pressed into the second part.

9. The method according to claim 8, comprising metering, via a valve of the elongated tool, a volumetric flow of the pressurized fluid supplied for the injection.

10. The method according to claim 1, comprising:
removing the sealing element from the second part after the oil press fit has been produced or released.

* * * * *